United States Patent Office 3,219,293
Patented Nov. 23, 1965

3,219,293
GUIDANCE OF MISSILES
Guy Malcolm Parker, Harpenden, Geoffrey Thompson, Luton, and John Bradley, Hitchin, England, assignors to The English Electric Company Limited, London, England, a British company
Filed May 7, 1959, Ser. No. 811,761
Claims priority, application Great Britain, May 13, 1958, 15,369/59
3 Claims. (Cl. 244—14)

This invention relates to the guidance of missiles.

It is the object of this invention to provide a new and improved guidance system for missiles, particularly those having a short range, as for example 50 miles.

According to the invention, a missile guidance system comprises locus guidance means adapted to guide the missile along a course which is geometrically conic in form. By "geometrically conic in form" is meant curves of parabolic, hyperbolic, elliptic, and circular form, including part of a parabola, hyperbola, ellipse, or circle.

According to a feature of the invention, said locus guidance means is adapted to guide the missile along a multi-stage course of which different stages are geometrically straight lines or simple conic curves.

According to a preferred feature of the invention, said locus guidance means is adapted to guide the missile along a three-stage course of which the first stage of the trajectory is a straight line, the second stage of the trajectory is conical, and the third stage of the trajectory is a straight line.

Preferably, the second stage of the trajectory is a circular arc and all said stages are coplanar.

Figure 1:
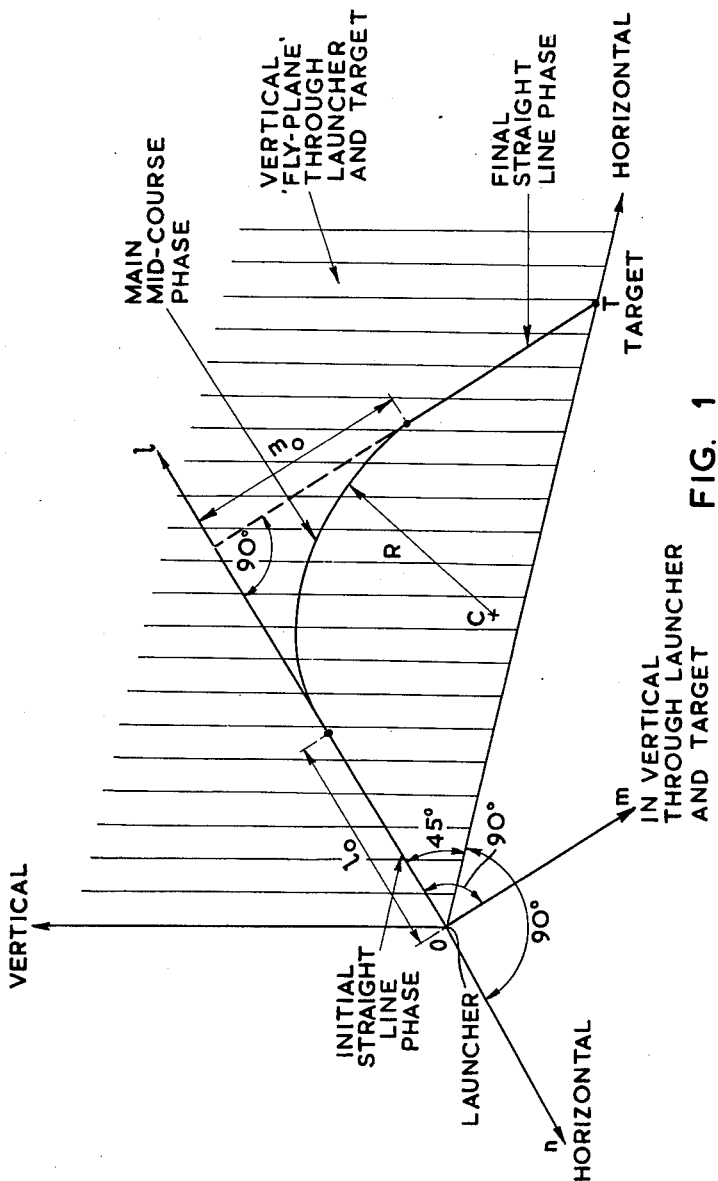
Figure 2:
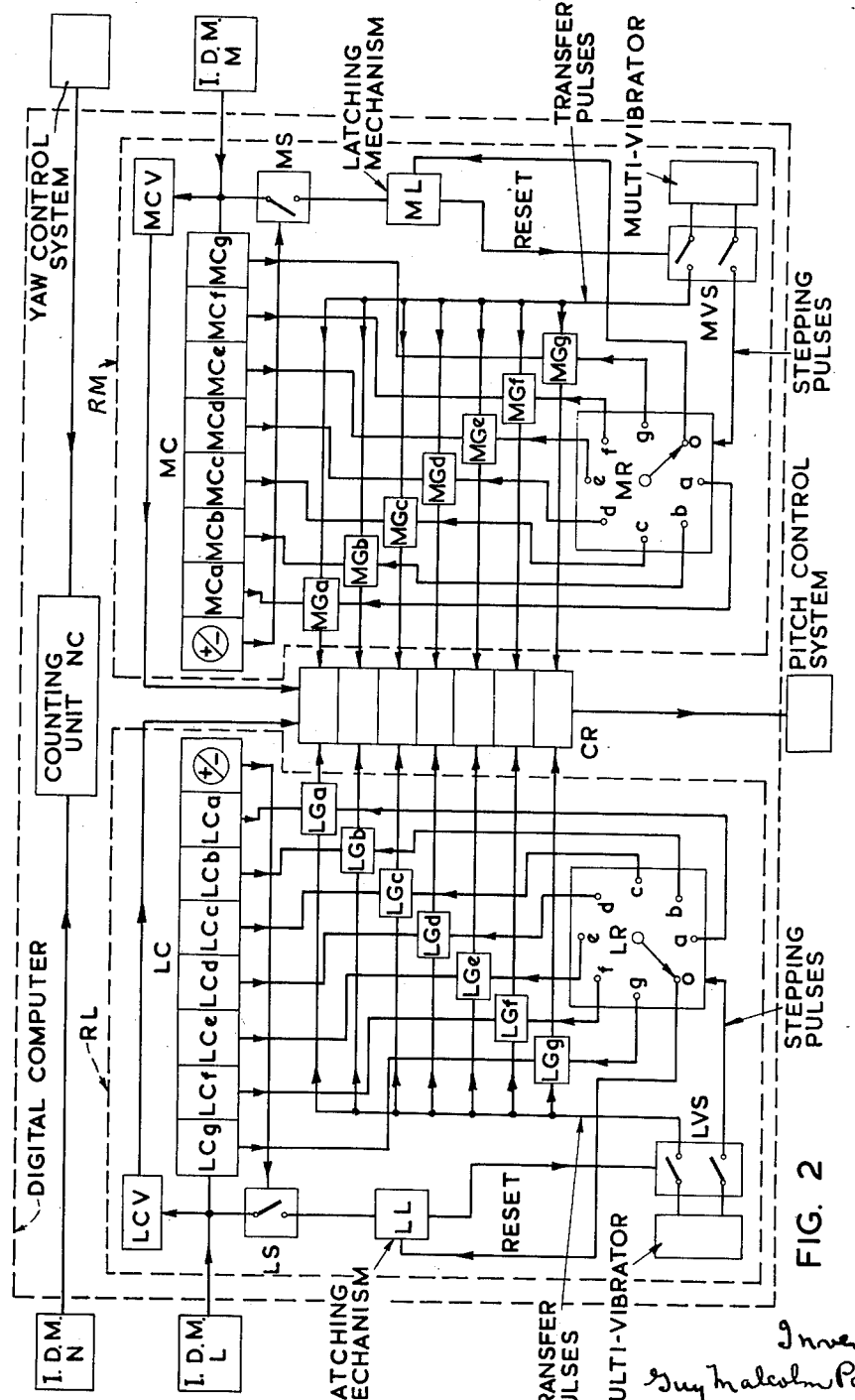

Features of the invention will be apparent from the following description with reference to the accompanying drawings in which:

FIG. 1 shows the geometrical configuration of an axis system and trajectory applicable to a preferred embodiment of the invention, and FIG. 2 shows in simple schematic form a guidance computer for use in a guidance system embodying the invention.

The principle of locus guidance as opposed to tracer guidance can be applied with advantage in short range missiles. This invention relates to such an application and aims at simplifying the computation problems which are involved in missile guidance. The need for such simplicity without sacrificing accuracy arises particularly where the computer is carried by the missile and the whole guidance system is airborne.

The missile guidance apparatus to be described with reference to the accompanying drawings is operative to guide the missile along a trajactory having three distinct phases. The first of these is an initial straight line. This is followed by the main phase in which the missile is constrained to follow a circular path, and finally the missile enters a straight line end phase.

Another feature by which the guidance computation is simplified involves the choice of a guidance locus by which the angles of ascent and descent are equal and respectively parallel to co-ordinate reference axes in the plane of the trajectory. For a special case where the angles of ascent and descent are both 45° the locus of the missile trajectory takes the form shown with reference to FIG. 1.

Here, an orthogonal co-ordinate reference system is used, the co-ordinate reference axes being denoted $Ol$, $Om$, and $On$ respectively. The $Ol$ and $Om$ axes lie in the vertical plane containing the launcher at O and the target at T. For simplicity it is supposed that the launcher and target lie in the same horizontal plane. The axis $Ol$ is at an angle of 45° with the line joining the launcher and the target.

In this system the locus of the missile trajectory comprises an initial straight line stage corresponding to a missile ascent parallel with the $Ol$ axis. When the missile has traveled a distance $l_0$ in this direction the locus of the missile trajectory becomes a circular arc, and when the missile has followed this arc through an angle of 90° it is required to resume a straight line course for the final stage of its travel, this course being along a line parallel with the $Om$ axis of the co-ordinate reference system.

As shown in FIG. 1 the circular arc has a radius denoted R and a centre denoted C. Depending upon this consideration and other practical factors such as the boost characteristics of the missile and its aerodynamic performance these parameters R and $l_0$ can be predetermined for suitable performance.

The function of the missile guidance system is to control the missile to cause it to follow an ascent path in alignment with the $Ol$ reference axis until its journey in this direction covers the distance $l_0$. Then the system guides the missile along a circular arc of radius R until it reaches a position along this arc at which the arcuate flight path subtends an angle of 90° about the centre C, after which the missile is guided along a descent path parallel with the $Om$ axis.

This invention is particularly suited for application in a situation where the whole guidance equipment is airborne. The need for simplicity in the working principle of the computer used in the guidance equipment is emphasized in this case.

For such an application the navigational equipment may involve inertial measuring instruments such as gyroscopes and accelerometers. The former are used to define a spatial axis system, the physical embodiment of which is the stabilised platform. From the outputs of the accelerometers, which are mounted on the platform, the doubly-integrated components of the missile acceleration in this axis system are evaluated and these are processed in a guidance computer to yield demands which are passed to the missile control system. The satisfaction of these demands results in the missile flying along the desired trajectory from launcher to target.

In this particular application a convenient solution employs the following three principles:

(a) Precession of the stabilised platform at earth rate (an adjustment that can be made during the pre-launch procedure after the platform has been aligned on the target bearing.)

(b) The use of accelerometers whole doubly-integrated outputs (with respect to time) are pulse trains and the intervals between the consecutive pulses in a train represent standard increments of distance; the integrating distance meter (I.D.M.) is a neat example of such instruments.

(c) The use of a digital guidance computer.

FIG. 2 shows a schematic diagram of a digital guidance computer embodying the invention and operative in response to input pulses from three I.D.M. units L, M, N providing signal pulses indicating distance increments in the $Ol$, $Om$, $On$ axis directions respectively. Typical I.D.M. units known in the guided weapon art provide output pulses representing distance increments of 5 ft. In FIG. 2 the digital computer is shown to comprise a simple counting unit NC operative to provide the controlling output for the missile yaw control system and two more complex registering systems RL and RM connected to feed a common register CR to provide the controlling output for the missile pitch control system. The nature of the yaw control system and pitch control system is not relevant to this invention and it suffices to accept that the controlling outputs from the digital computer will in each case be analogue quantities having a magnitude related to the error involved and a polarity indicating the direction of this error. Thus, as a yaw control is required to restore the missile to the required vertical "fly-plane" through the launcher and the target the controlling output for the yaw control system needs merely to consist of a D.C. signal proportional to a summation, allowing for the direction of distance increments, of the output derived from the I.D.M. unit N. The function of the yaw control is then merely to guide the missile in a sense tending to reduce this D.C. signal to zero. The missile pitch control directs the attitude of the missile in the "fly-plane" and the controlling output from the computer in this case needs merely to consist of a D.C. signal having a polarity indicating a need for increased or decreased missile pitch and an amplitude which is greater the greater the need for this change of pitch. The function of the pitch control system is to guide the missile in a sense tending to reduce this D.C. signal to zero.

The I.D.M. units L, M and N supply to the computer pulses which are suitably coded for sign and which represent predetermined distance increments in the $Ol$, $Om$, $On$ directions respectively. The pulses supplied by the I.D.M. unit N enter a counting unit NC which supplies directly the necessary analogue output signal for controlling the yaw control system. The pulses supplied by the I.D.M. unit L are fed into the deviation register RL where they are supplied to a binary digital counting unit LC and through a switch LS. In the unit LC these pulses are added to, or subtracted from, the existing content of the unit according to their coded sign and provide an output which can be expressed symbolically by the expression $l = \Sigma \Delta 1 - l_0$. Here, $\Delta l$ denotes the incremental distance indicated by a pulse from the I.D.M. unit L. As $\Delta l$ may be positive or negative the summation $\Sigma \Delta l$ will be a measure of the distance travelled by the missile in the $Ol$ direction since the count action of the unit LC began. $l_0$ is the content of this unit initially. Thus the expression for $l$ will change from negative to positive when the missile has travelled the distance $l_0$ in the $Ol$ direction.

In FIG. 2 the unit LC provides a controlling output signal which changes from negative to positive when $l$ changes from negative to positive. This output signal controls the position of the switch LS, causing it to be open when $l$ is negative and closed when $l$ is positive. As soon as $l$ passes through zero and becomes positive switch LS closes to admit future pulses from the I.D.M. unit L and each such pulse operates a latching mechanism LL which initiates a single cyclical operation of a rotary switch LR. The rotary switch LR has eight positions and is stepped from one position to the next by successive pulses supplied from a free running multivibrator through a switch LVS. When the latching mechanism LL is operated by a pulse supplied through the switch LS the switch LVS is closed to supply two output trains of pulses (180° apart in phase), each having a repetition rate of about 10 kc/s., from the multivibrator. One of these output trains of pulses is used to provide the stepping pulses for the rotary switch LR and the other provides the transfer pulses for the binary digital coding of the output from the counting unit LC. These latter pulses are supplied through a gate circuit comprising a series of gates LG which are open or closed according to the content of the counting unit LC in relation to the condition of the rotary switch LR.

In operation, when a condition is reached by which the switch LS is closed the next pulse to arrive from the I.D.M. unit L will, if of the appropriate sign, add to the count stored in the unit LC and will also be supplied to the latching mechanism to close the switch LVS until the latching mechanism is reset. When the switch LVS is closed the stepping and transfer pulses from the multivibrator are allowed to pass through. The stepping pulses step the rotary switch LR (anticlockwise) as shown from an initial position $o$ to positions $a, b, c, d, e, f, g$, and then to the initial position $o$ in succession. The latching mechanism is tripped automatically when the position $o$ is reached, so opening the switch LVS. In this way the pulses supplied from the I.D.M. unit L which take the content of the unit LC above a value sufficient to balance its initial content $l_0$ of the unit LC each initiate a cycle of rotation of the switch LR accompanied by a train of eight transfer pulses supplied at 100 microsecond intervals (approximately).

The gates LG function when the rotary switch LR selects the appropriate binary digit store $LCa$, $LCb$, $LCc$ etc. of the unit LC and the selected store is charged. Thus, by way of example, if the store $LCa$ is charged and switch LR is in position $a$ the gate $LGa$ will be in a signal-passing condition and will remain so until the next stepping pulse is received by the switch LR 100 microseconds later. However, in the meantime a transfer pulse is supplied through the switch LVS and passes through the gate $LGa$ to the common register CR. If the store $LCa$ is uncharged then the gate will be blocked and will not supply a transfer pulse as output during this cycle of the switch LR. The other gates $LGb$, $LGc$, $LGd$ etc. operate similarly to supply transfer pulses along other output lines according to the content of the unit LC. The rotary switch LR and the gates $LGa$, $LGb$ etc. constitute a reading system for reading out the contents of the integrator register LC. For correct operation the time spacing of the pulses supplied by the I.D.M. unit L should not be less than the 800 microsecond period required for one cycle of operation of the switch LR.

The general action of the whole registering system RL is to provide a binary coded pulse train as a measure of the quantity $l$ each time a pulse over and above the prespecified number corresponding to $l_0$ is supplied by the I.D.M. unit L. By adding these binary coded pulse trains a quantity which is a measure of $l$ times the distance moved in the $Ol$ direction in a specified time is obtained. The components of the registering system RL, other than the integrating unit LC, thus act as a multiplier circuit supplying a quantity representing the product $l:\delta l$ to the common register CR in response to each $\delta l$ input signal. However, no output is forthcoming from the registering system RL unless the missile has moved a sufficient distance in the $Ol$ direction to render $\Sigma \Delta l$ greater than the basic quantity $l_0$.

The registering system RM is shown to be identical with the registering system RL save that it responds to pulses supplied by the I.D.M. unit M and also save that in this case the switch or gating device MS is closed when the content of unit MC is negative and open when this content is positive. Here, the content of the integrating unit MC is denoted $m$ and is equal to $\Sigma \Delta m - m_0$ where $\Delta m$ is the incremental distance equivalent of a pulse supplied by the I.D.M. unit M and $m_0$ is a basic predetermined reference distance having the significance shown in FIG. 1. Ideally, $m_0$ is the parameter R.

The components of the registering system RM supply to the common register CR in response to each $\delta m$ input signal a quantity which is measure of $m$ times the distance moved in the $Om$ direction in a specified time, that is to say, $m:\delta m$. However, no output is forthcoming from the registering system RM after the missile has moved a sufficient distance in the $Om$ direction to render $\Sigma \Delta m$ greater than the basic quantity $m_0$.

In the digital computer shown in FIG. 2 the binary coded outputs from the two registers RL and RM are added in the common register CR which operates to perform a digital to analogue conversion ot produce a D.C. output signal proportional to its stored content.

The operation of this common register requires a synchronized operation of the multivibrators of the two registering systems RL and RM, or in practice a common source may be used, in order that the binary coded outputs from the two registers may be staggered for common addition by the common register CR. Further-more, to enable the common register to account for the incremental or decremental aspect of the successive quantities $\Delta l$ or $\Delta m$ an add/subtract control is provided by control units LCV and MCV respectively sensitive to the signs of the represented quantities $\Delta l$ and $\Delta m$.

These units condition the operation of the common register CR to cause it to add or subtract the incoming coded data according to its source.

Consider now the operation of the digital computer shown in FIG. 2 over the whole course of flight of a missile as represented by FIG. 1.

Initially, there is, following launch, no output from the registering system RL. There is an output from the system RM and this is fed to the common register CR. The value of $m$ is initially negative and equal to $-m_o$. Consequently, if the missile wanders in the $Om$ direction, as successive additions of this quantity are introduced to the common register CR the analogue output signal from this register will build up and produce a strongly negative output signal which operates to control the missile pitch control system and thereby direct the missile towards the $mO$ direction. When this occurs the next set of digitally coded data will be classified by the control unit MCV as negative with the result that the quantity $-m_o$ will be subtracted from the quantity stored in the common register. This process will, in fact, result in the guidance of the missile along a course for which its deviation in the $Om$ direction from the axis $Ol$ is kept very small. The missile will follow a straight line course until the register RL becomes operative to introduce its own control data into the common register CR. This occurs when the missile has travelled a distance $l_o$ to close the switch LS. The guidance path of the missile is now sensitive to the assurance of a mathematical condition of the form:

$$l\delta l + M\delta m = 0$$

This is the differential equation of a circle of radius $\sqrt{l^2+m^2}$. Since $m=-m_o$ at $l=0$, that is at the instant switch LS closes, the radius R of the circle is equal to the parameter $m_o$.

Accordingly, the missile is guided along a circular arc and continues to be so guided until switch MS opens. Then, the common register CR becomes sensitive only to the output from the system RL. By this stage the content of the unit MC is equal to $m_o$ and the missile pitch control is such as to guide the missile in a sense which will reduce further deviation of the missile from a rectilinear flight path parallel with the $Om$ axis.

During the flight of the missile the counting unit NC is operative to help in keeping the missile in the required vertical "fly-plane" through the launcher and the target.

In a practical embodiment of this invention the various switching functions of the digital computer may be performed by transistor circuits and the binery code registers may similarly comprise an assembly of known transistor trigger circuits. Such circuits are well known to those skilled in the computer art and are not described in detail in this specification because the invention lies in a particular combination of known circuit elements.

The digital computer described will guide the missile along a circular mid-course stage only provided the pulses supplied by the I.D.M. units L and M represent equal distance increments. It may be shown that if these I.D.M. units have different scale factors in the sense that their signal pulses represent increments of distance which are different for the different I.D.M. units then the mid-course shage of the missile trajectory will become elliptical in form.

Alternatively, an effect equivalent to this can be achieved by modifying the computer so that the common register is more sensitive to data derived from one I.D.M. unit than it is to data derived from another I.D.M. unit.

It is further possible to obtain a hyperbolic mid-course guidance path provided the digital computer shown in FIG. 2 is modified so that switches LCV and LS are connected to admit the I.D.M. unit M pulses instead of the I.D.M. unit L pulses and MCV and MS admit the pulses from the I.D.M. unit L instead of those from the I.D.M. unit M.

What we claim as our invention and desire to secure by Letters Patent is:

1. A missile guidance system comprising a yaw detection means for measuring changes in distance from a preselected yaw plane which extends through the launch and target points and generating signals indicative thereof;
   yaw computer and control means for converting said yaw signals into missile yaw control signals to keep said missile in said yaw plane;
   a first pitch distance detection means for measuring changes in distance along an axis in said yaw plane perpendicular to a preselected straight line pitch course and generating first pitch signals indicative thereof;
   a second pitch detection means for measuring changes in distance along a line in the yaw plane perpendicular to a second preselected straight line course and generating second pitch signals indicative thereof;
   a digital computer means for detecting the signals of said first and second pitch detection means, said computer including means pre-set to define a predetermined conic path relationship between the said signals, and further including comparison means, including a common register connected to receive said signals to compare said conic path relationship with that between said first and second signals and to produce a differential output; and
   a pitch control means for positioning the missile;
   said register providing an output to said pitch control means to control said missile in said conic path.

2. A missile guidance system comprising a yaw detection means for measuring changes in distance from a preselected yaw plane which extends through the launch and target points and generating signals indicative thereof;
   yaw computer and control means for converting said yaw signals into missile yaw control signals to keep said missile in said yaw plane;
   a first pitch distance detection means for measuring changes in distance along an axis in said yaw plane perpendicular to a preselected straight line pitch course and generating first pitch signals indicative thereof;
   a second pitch detection means for measuring changes in distance along a line in the yaw plane perpendicular to a second preselected straight line course and generating second pitch signals indicative thereof;
   a digital computer means for detecting the signals of said first and second pitch detection means, said computer including means pre-set to define a predetermined conic path relationship between the said signals, a common register, means for entering into said common register signals of opposite senses representing the distances along said first and second straight line courses, said common register providing a differential error output when the relationship between said signals is different from said predetermined conic path relationship; and
   a pitch control means receiving said differential error output to control missile in said conic path.

3. A missile guidance system comprising a yaw detection means for measuring changes in distance from a preselected yaw plane which extends through the launch and target points and generating signals indicative thereof;
   yaw computer and control means for converting said yaw signals into missile yaw control signals to keep said missile in said yaw plane;
   a first pitch distance detection means for measuring changes in distance along an axis in said yaw plane perpendicular to a preselected straight line pitch course and generating first pitch signals indicative thereof;
   a first pitch computer means for receiving and converting said first pitch generated signals into missile pitch control signals which function to keep the missile along a straight line preselected pitch course in the yaw plane;

common register means and pitch control means receiving the pitch control signals to position said missile;

a second distance pitch detection and signal means to determine the distance traveled by said missile along said first preselected pitch course and producing a signal indicative thereof;

first means for generating a signal indicative of a preselected distance along said first course that the missile should travel;

a first pitch digital comparison means for comparing the measured distance along said pitch course and said preselected pitch signal;

a first switch means responsive to said first pitch comparison means which is actuated when such comparison is at a zero level;

a second means for generating a signal indicative of a preselected distance along a line in said yaw plane which is perpendicular to said first preselected straight line pitch course;

a second digital computer means including part of said first pitch computer means for detecting the signals of said first and second pitch detection means, said computer means including means to generate signals which correspond to a preselected conic path, said computer including comparison means to compare said preselected conic path signals with said first and second pitch detection signals and to produce a differential error output;

said register means connected to receive said differential output;

said register providing an output to said pitch control means to control said missile in said conic path;

a second pitch digital comparison means which compares the distance traveled by the missile along said line in said yaw plane perpendicular to said first preselected straight line pitch course;

second switch means connected to said first pitch detection means which is actuated by said second pitch comparison means when said comparison value is at zero level, and disconnects said first pitch detection means from said computer means;

said second pitch detection means for measuring changes in distance along a line in the yaw plane perpendicular to a second preselected straight line course and generating second pitch signals indicative thereof; and a third computer means which is part of said second pitch computer means for converting said second pitch generated signals into missile control signals to keep said missile in a straight line preselected pitch course;

said register means and pitch control means receiving said signals to control said missile in said second preselected straight line path.

References Cited by the Examiner
UNITED STATES PATENTS

| | | | |
|---|---|---|---|
| 2,821,349 | 1/1958 | Sohn | 244—14 |
| 2,873,074 | 2/1959 | Harris et al. | 244—14 |
| 2,932,467 | 4/1960 | Scorgie | 244—14 |
| 2,946,539 | 7/1960 | Fischel | 244—14 |

OTHER REFERENCES

The Gyroscope Applied, K.I.T. Richardson, the Philosophical Library, N.Y., and G.B., pp. 351–356.

SAMUEL FEINBERG, *Primary Examiner.*

CHESTER L. JUSTUS, *Examiner.*